J. A. CRAIG.
FEED BLENDING MACHINE.
APPLICATION FILED FEB. 7, 1910.

1,001,508.

Patented Aug. 22, 1911

Witnesses

Inventor
J. A. Craig
by
E. J. Featherstonhaugh
Atty

UNITED STATES PATENT OFFICE.

JAMES ARCHIBALD CRAIG, OF TORONTO, ONTARIO, CANADA.

FEED-BLENDING MACHINE.

1,001,508.   Specification of Letters Patent.   Patented Aug. 22, 1911.

Application filed February 7, 1910. Serial No. 542,501.

*To all whom it may concern:*

Be it known that I, JAMES ARCHIBALD CRAIG, a citizen of the United States of America, and resident of the city of Toronto, county of York, Province of Ontario, in the Dominion of Canada, have invented certain new and useful Improvements in Feed-Blending Machines, of which the following is a specification.

The invention relates to improvements in feed blending machines, as described in the following specification and illustrated in the accompanying drawings that form part of the same.

The invention consists essentially in the novel construction and arrangement of parts, whereby the ingredients to be blended are violently agitated within a closed casing by a rotary member supported within said casing and having spiral webs.

The objects of the invention are to thoroughly blend molasses or any other desired fluid substance with chopped or ground feed so that the product will be free from lumps or cakes and will be palatable to the animals and easy to digest, to enable the preparation of fresh feed for every meal and thus obviate the necessity of using harmful preservatives, and to devise a machine which will blend the constituents quickly and in large quantities, of simple construction and easy to operate.

Figure 1:
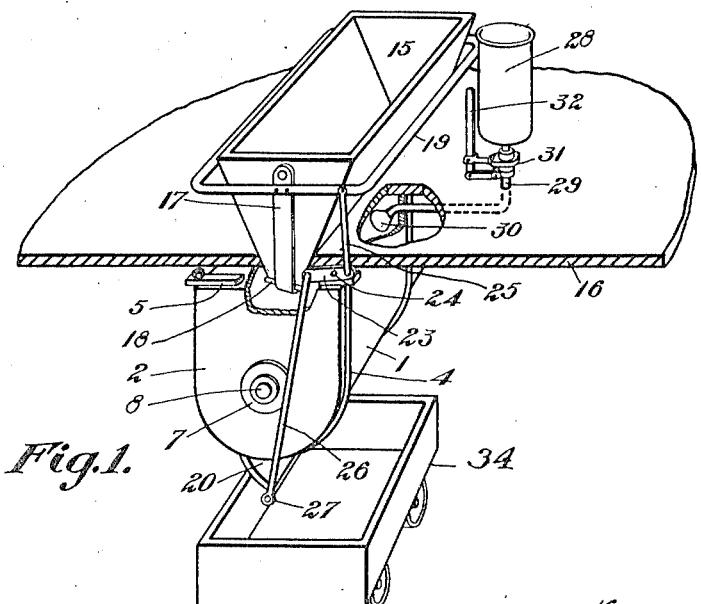
Figure 2:
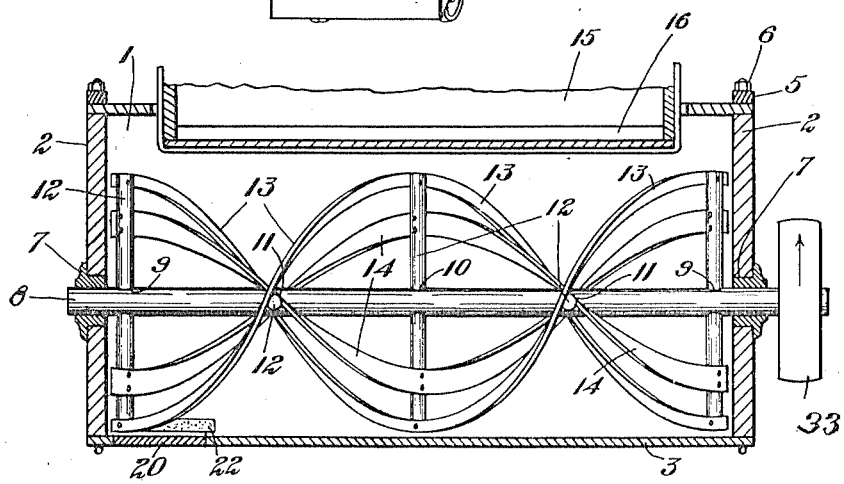
Figure 3:
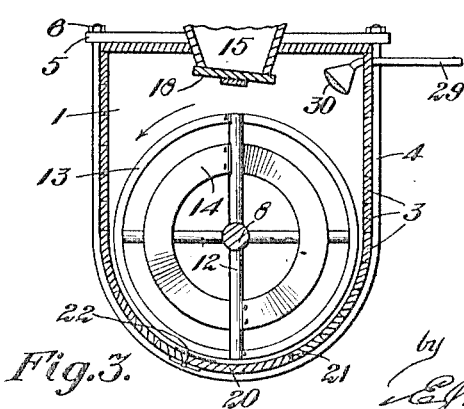

In the drawings, Figure 1 is a perspective view of the device shown installed and ready to operate, part of the casing being broken away. Fig. 2 is a longitudinal vertical sectional view of the blending mechanism. Fig. 3 is a vertical cross sectional view of the blending mechanism.

Like numerals of reference indicate corresponding parts in each figure.

Referring to the drawings, 1 is a casing having a semi-cylindrical bottom and preferably formed with solid ends 2 and the boards 3 fitted closely to the edges of said ends and held securely thereto by the clevis shaped rods 4, said rods having threaded ends extending through the cross bars 5 and secured by the nuts 6. The boards 3 are thus held securely without nails or other fastenings.

7 are journal bearings secured in the ends 2 in central relation with the cylindrical bottom of the casing 1. 8 is a shaft rotatably supported in the bearings 7 and having the holes 9 therethrough arranged adjacent to the inner walls of the ends of said casing and in horizontal alinement with each other.

10 is a hole arranged mid-way between the holes 9 and in parallel alinement therewith.

11 are holes arranged mid-way between the holes 9 and 10 and in right angular relation thereto.

12 are a plurality of round bars extending through the holes 9, 10 and 11 and secured therein from longitudinal displacement, the ends of said bars being arranged to clear the inner wall of the casing 1 on the rotation of the shaft 8.

13 are narrow flat strips of metal bent into spiral shape and rigidly secured to the extreme ends of the bars 12, the outer edges of said strips being arranged to just clear the inner wall of the casing. These strips are shown as left hand spirals.

14 are broad flat metal strips bent into spiral shape and rigidly secured to the cross bars 12 intermediately between the strips 13 and the shaft 8, their outer edges being arranged a uniform distance from the inner circular wall of the casing. The strips 14 are shown as right hand spirals and are considerably broader than the strips 13.

15 is a hopper rigidly supported above the casing 1 and extending through the top thereof. The casing 1 is preferably supported from the underside of the floor 16 in the barn or stable and the hopper 15 extends through the said floor so that the feed may be placed in the hopper from the upper room or loft of the building and the device will discharge into the lower room.

17 are arms pivotally secured to the ends of the hopper 15 adjacent to the top thereof and extending downwardly a short distance below the bottom edge of said hopper. 18 is a door rigidly secured to the lower ends of the arms 17 and closing the opening at the bottom of said hopper. The bottom open end of the hopper 15 is preferably sloped slightly and the door 18 is arranged to fit snugly against the bottom thereof when the arms 10 are in a vertical position.

19 is a handle preferably formed of a length of piping rigidly secured to the arms 17 and extending around the hopper adjacent to its top.

It will be readily understood that a downward pressure on one side of the handle 19 will swing the arms 17 upon their pivots and throw the door 18 clear of the bottom of the hopper, thus allowing the contents of the hopper to drop into the casing 1.

20 is a trap door hinged in the bottom of the casing 1 and closing the opening 21 arranged close to one end of said casing. The door 20 is preferably hinged to the outside to swing outwardly and a flap of leather or other suitable material is secured to the inner wall of the casing 1 to overhang the hinged joint to prevent the lodging of the feed in the joint.

23 is a lever pivotally supported from a rigid pivot 24.

25 is a rod connecting the handle 19 with one end of the lever 23. 26 is a rod pivotally connected to the opposite end of the lever 23 and extending downwardly and pivotally connected to a pin 27 extending from the trap door. The short end of the lever is connected by the rod 25 to the handle and a very short movement of the handle swings the long end of the lever a sufficient distance to close the trap door quickly in order that the feed will not be discharged prematurely.

28 is a tank or other suitable receptacle arranged adjacent to the hopper 15 and having a pipe 29 leading therefrom to and through the side of the casing 1, said pipe having a spray nozzle 30 at its inner end adapted to spray the molasses or other fluid into the said casing.

31 is a quick opening valve arranged in the pipe 29 and having a suitable hand lever 32 for operating the same.

In the use of this device, the grain, or other feed which has been previously ground, is placed in the hopper 15 and the desired quantity of molasses or other fluid with which it is desired to blend the feed is placed in a tank 28. The shaft 8 and spiral members connected therewith are rotated rapidly within the casing 1 by any suitable means, a pulley 33 being shown attached to one end of the shaft. The operator then opens the hopper by swinging the handle 19 and consequently the arms 17, thus moving the door 18 clear of the bottom opening of the hopper, allowing the feed to fall into the casing. Simultaneously with the downward movement of the handle 19 the operator opens the valve 31 allowing the molasses or other fluid to flow through the pipe 29. The feed in falling comes in contact with the rapidly rotating spiral strips and is immediately broken up and violently agitated, the strips 14 throwing the said feed back and forth very rapidly and preventing it from falling in a mass to the bottom of the casing. The narrow outer strips rotating close to the inner wall of the casing pick up the ground feed that passes the broader strips and throws it again into contact with the larger body held in suspension. The molasses being sprayed into the casing 1 comes in contact with the violently agitated feed and becomes thoroughly blended therewith and does not cake in any way. The peculiar arrangement of the inner and outer spiral strips is such that the outer spirals work the feed toward the opening 21 but the inner strips being pitched oppositely to the outer ones throw the grain away from the opening 21, thus preventing the feed from piling up at one end and jamming into a mass.

Only a few seconds' operation is necessary, to thoroughly blend the materials and on the release of the handle 19 the arms 17 swing back to their normal position swinging the door 18 against the bottom and closing the hopper. Coincidently with the closing of the hopper the lever 23 and rods 25 and 27 swing the trap door 20 downwardly. On the clearing of the opening 21 the blended feed drops through into a suitable truck 34 placed underneath the machine, the spiral strips 12 carrying the said feed to the discharge opening and clearing the casing.

In blending feed it is very essential that the operation be performed very rapidly and that no particles of the feed or the fluid to be mixed therewith be allowed to rest, otherwise the material will immediately cake and jam up the machine.

The rotary member formed by the shaft 8 and the rods and spiral members connected thereto is rotated at a speed sufficiently rapid to hold the major portion of the feed in suspension and the rapid and violent agitation blends the fluids and solids thoroughly.

What I claim as my invention is:—

1. In a feed blending machine, a stationary casing having a longitudinal feed opening in the top thereof and an outlet opening through the bottom, means for closing said outlet, a shaft rotatably supported in the ends of said casing and extending therethrough, right and left hand spirally arranged blades, each extending the full length of the casing and rigidly connected to said shaft and adapted to be rotated within said casing and to move in relation to its inner surface, and means for rotating said shaft and spiral blades.

2. In a feed blending machine, a casing having a semi-cylindrical bottom, journal bearings secured to the ends of said casing, a shaft journaled in said bearings and extending through said casing, a plurality of cross bars rigidly secured to said shaft and rotating therewith, a narrow strip of metal bent into spiral form and rigidly secured adjacent to the extremities of said cross bars, and a broader strip of metal bent in spiral form and of the opposite spiral to the aforesaid strip and rigidly secured to said cross bars intermediate of their length.

3. In a feed blending machine, a casing having a semi-cylindrical bottom, journal bearings secured to the ends of said casing, a shaft journaled in said bearings, a plurality of cross bars secured to said shaft and rotating therewith, narrow strips of metal bent in spiral form and rigidly secured to the extremities of said cross bars and rotating in close proximity to the inner wall of said casing, and broad flat metal strips bent into spiral form and of the opposite spiral or thread to the aforesaid strips and rigidly secured to said cross bars intermediately between the outer strips and said shaft.

4. In a feed blending machine, a casing having an opening in the top thereof and a discharge opening in the bottom, a rotary member supported within said casing, a hopper suitably supported above said casing and having its discharge end extending through said opening, a pair of arms pivotally connected to the ends of said hopper, a door rigidly secured to the lower ends of said arms and adapted to close the bottom of said hopper, a handle member rigidly secured to said arms and extending around said hopper, and means for allowing the discharge of the feed from said casing.

5. In a feed blending machine, a casing having a semi-cylindrical shaped bottom and a discharge opening in said bottom at one end thereof, a trap door hinged to said bottom and adapted to swing downwardly from said opening, a rotary member rotatably supported in said casing, a hopper supported above said casing and discharging thereinto, means for opening and closing said hopper, and means operatively connected with the means for opening and closing said hopper for swinging said trap door on its hinges.

6. In a feed blending machine, a casing having a semi-cylindrical shaped bottom and a discharge opening in said bottom at one end thereof, a trap door hinged to said bottom and adapted to close said opening, a rotary member rotatably supported in said casing, a hopper supported above said casing and discharging thereinto, means for opening and closing said hopper, a lever supported upon a rigid pivot, a rod at one end pivotally connected to said lever and at the other end to the means for opening and closing said hopper, and a rod pivotally connected at one end to the other end of said lever connected at its other end to said trap door.

Signed at the city of Toronto, county of York, Province of Ontario, Canada, this 21st day of January 1910.

JAMES ARCHIBALD CRAIG.

Witnesses:
H. DENNISON,
E. HERON.